(12) United States Patent
Gu

(10) Patent No.: US 10,030,197 B2
(45) Date of Patent: Jul. 24, 2018

(54) ETCHING SOLUTION

(71) Applicant: BOE TECHNOLOGY GROUP CO., LTD., Beijing (CN)

(72) Inventor: Feng Gu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 48 days.

(21) Appl. No.: 14/769,097

(22) PCT Filed: Mar. 20, 2015

(86) PCT No.: PCT/CN2015/074731
§ 371 (c)(1),
(2) Date: Aug. 19, 2015

(87) PCT Pub. No.: WO2016/082384
PCT Pub. Date: Jun. 2, 2016

(65) Prior Publication Data
US 2016/0340581 A1 Nov. 24, 2016

(30) Foreign Application Priority Data
Nov. 24, 2014 (CN) .......................... 2014 1 0682417

(51) Int. Cl.
C09K 13/08 (2006.01)
C03C 15/00 (2006.01)

(52) U.S. Cl.
CPC .............. C09K 13/08 (2013.01); C03C 15/00 (2013.01)

(58) Field of Classification Search
CPC ..................................................... C03C 15/00
See application file for complete search history.

(56) References Cited

U.S. PATENT DOCUMENTS

| 2,890,944 A * | 6/1959 | Hays ......................... C23F 1/28 148/253 |
| 5,869,403 A * | 2/1999 | Becker .............. H01L 21/31111 257/E21.251 |
| 2004/0055994 A1* | 3/2004 | Miwa ...................... C03C 15/00 216/2 |
| 2016/0313494 A1* | 10/2016 | Hamilton ............. G02B 6/0068 |

FOREIGN PATENT DOCUMENTS

| CN | 1944307 A | 4/2007 |
| CN | 101140374 A | 3/2008 |
| CN | 101210340 A | 7/2008 |
| CN | 101215099 A | 7/2008 |
| CN | 102643027 A | 8/2012 |
| CN | 103508676 A | 1/2014 |
| JP | H04349189 A | 12/1992 |
| JP | 2009073711 A | 4/2009 |

OTHER PUBLICATIONS

Machine translation of CN102643027, Chen et al. Apr. 26, 2012.*
Machine translation of CN103508676, Jin et al. Jan. 15, 2014.*
International Search Report and Written Opinion in Chinese and partial English for PCT Application No. PCT/CN2015/074731 dated Jun. 29, 2015, 12 pages.
Second Chinese Office Action dated Aug. 19, 2016, for corresponding Chinese Application No. 201410682417.0.
First Chinese Office Action dated May 3, 2016, for corresponding Chinese Application No. 201410682417.0.

* cited by examiner

Primary Examiner — Queenie S Dehghan
(74) Attorney, Agent, or Firm — Kinney & Lange, P.A.

(57) ABSTRACT

The invention provides an etching solution, comprising: 10 to 30 wt % of phosphoric acid; 2 to 20 wt % of nitric acid; 6 to 18 wt % of hydrofluoric acid; 5 to 10 wt % of hydrochloric acid; and water, wherein the weight percentages are based on the weight of the etching solution. The etching solution can be used for thinning the substrate in large-scale production, dissolving the precipitated impurities attached to the surface of the substrate after substrate thinning so as to remove effectively the impurities on the surface of the substrate, improve the qualified ratio and passed ratio of a product, and at the same time, provide the effective insurance for controlling the thickness of the substrate.

8 Claims, No Drawings

ETCHING SOLUTION

FIELD OF THE INVENTION

The invention relates to the substrate thinning and etching of a flat panel display, and specifically, to an etching solution used in a process for the substrate thinning of a flat panel display.

BACKGROUND OF THE INVENTION

A flat panel display comprises a liquid crystal display (LCD), a touch screen (TP), a plasma display panel (PDP) and an organic light-emitting device (OLED). The liquid crystal display draws the most attention in the field of flat panel displays, due to the characteristics of bright image based on superior resolution, low energy consumption as well as thinner display image provided by it. The liquid crystal display is used in movable devices including mobile telephones, and notebook PC, and televisions.

During the process for producing a flat panel display, the use of a glass substrate is demanded. Due to the limitation in the process of the glass substrate, the produced glass substrate is thicker. In order to further reduce the weight of the display devices, more and more manufacturers utilize a process for thinning the glass substrate, and as a result, the etching of the glass substrate became an important issue.

The commonly used thinning process comprises 2 processes, that is a physical process and a chemical etching process. The physical process performs polishing and grinding by using a polishing powder, however, this process is characterized in longer thinning time, un-controllable precision and lower non-defective ratio. The chemical etching process makes use of an etching solution, and this process is characterized in shorter thinning time, lower invest for the apparatus, higher non-defective ratio, and additionally, the thinning liquid has a simple composition and lower cost. Thus, the chemical etching process gradually becomes a main technology process for thinning a glass substrate.

The etching solutions in the prior art have a faster etching rate for the substrate and the etching amount thereof is not easy to be controlled, and thus, the thickness of the substrate cannot be well controlled. Some of the etching solutions cannot effectively dissolve silicates. Some of the etching solutions will produce stronger electro-ionization to produce too much hydrofluoric acid, and thus, the etching rate is not easy to be controlled. Some of the etching solutions produce a great deal of bubbles, which reduces the etching rate.

Therefore, it is demanded to provide an etching solution and a process for etching a glass substrate, which dissolves the precipitated impurities attached to the surface of the substrate after substrate thinning so as to remove effectively the impurities on the surface of the substrate, improves the qualified ratio and non-defective ratio of the products, and at the same time, provides the effective insurance for controlling the thickness of the substrate.

SUMMARY OF THE INVENTION

An object of the invention is to provide an etching solution and a process for etching a glass substrate, which can achieve the technical effect of removing the impurities on the surface of the substrate by dissolving and etching the impurities on the surface of the substrate, so as to solve effectively the problem of lower non-defective ratio of a substrate due to the attachment of the particulate impurities.

Thus, in one aspect, the invention provides an etching solution, comprising:
10 to 30 wt % of phosphoric acid;
2 to 20 wt % of nitric acid;
6 to 18 wt % of hydrofluoric acid;
5 to 10 wt % of hydrochloric acid; and
water,
wherein the weight percentages are based on the weight of the etching solution.

In another aspect, the invention provides a process for etching a glass substrate, comprising:
contacting the above etching solution with the glass substrate.

DETAILED DESCRIPTION OF THE INVENTION

The etching solution provided in the invention can comprises 10 to 30 wt % of phosphoric acid; 2 to 20 wt % of nitric acid; 6 to 18 wt % of hydrofluoric acid; 5 to 10 wt % of hydrochloric acid; and water, wherein the weight percentages are based on the weight of the etching solution.

By using phosphoric acid, the F ion activity may be maintained by using the three-step ionization effect of phosphoric acid.

By using nitric acid, silicate can be kept in a dissolving state by providing nitrate ions.

By using hydrofluoric acid, F ions can be provided to afford an acid solution generally with a thinning effect.

By using hydrochloric acid, in combination of the above nitric acid, the acid solution possesses the property of aqua regia, which may dissolve silicate.

In one preferable embodiment, the etching solution can comprise an anionic surfactant.

In one more preferable embodiment, the anionic surfactant can be at least one anionic surfactant selected from the group consisting of sodium dodecyl sulfate, sodium dodecyl benzene sulfonate and sodium dioctyl sulfosuccinate.

In one further more preferable embodiment, the anionic surfactant can be at least one selected from the group consisting of sodium dodecyl benzene sulfonate and sodium dodecyl sulfate.

In one more preferable embodiment, the anionic surfactant may be 2 to 10 wt % of the total weight of the etching solution. Preferably, the anionic surfactant may be 3 to 8 wt % of the total weight of the etching solution.

In one preferable embodiment, the etching solution can comprise 10 to 20 wt % of nitric acid.

In another preferable embodiment, the etching solution is composed of:
10 to 30 wt % of phosphoric acid;
10 to 20 wt % of nitric acid;
6 to 18 wt % of hydrofluoric acid;
5 to 10 wt % of hydrochloric acid;
2 to 10 wt % of an anionic surfactant; and
a balance of water,
wherein the weight percentages are based on the weight of the etching solution.

When the content of hydrofluoric acid excesses 18 wt %, the etching rate for the substrate is too fast so that the etching amount is not easy to be controlled and the thickness of the substrate cannot be well controlled.

When the content of nitric acid is less than 2 wt %, silicate cannot be effectively dissolved.

When the concentration of phosphoric acid is more than 30 wt %, the etching solutions will produce stronger electro-ionization to produce too much hydrofluoric acid, and thus, the etching rate is not easy to be controlled.

When the concentration of the anionic surfactant is less than 2 wt %, the function of anionic surfactant cannot be realized. When the concentration of the anionic surfactant is more than 10 wt %, the etching solutions will produce a great deal of bubbles, which may reduce the etching rate. Thus, the concentration of the anionic surfactant should be between 2 wt % and 10 wt %, more preferably, between 3 wt % and 8 wt %.

The etching solution of the invention can be used for etching a glass substrate. The above etching solution can be contacted with the glass substrate. The contacting may comprise impregnating the glass substrate into the etching solution, wherein the contacting time is 300 s to 1500 s, and the contacting temperature is 30° C. to 38° C., in the vase where the size of the substrate ≤500 mm×600 mm; and the contacting time is 300 s to 1500 s, and the contacting temperature is 33° C. to 42° C., in the case where the size of the substrate >500 mm×600 mm.

The glass substrate can include a TFT glass substrate, as well as the glass substrates for a liquid crystal display (LCD) (specifically, including a twisted nematic type (TN), a super twisted nematic type (STN) and a color super twisted nematic type (STN)(CSTN)), a touch panel (TP), a plasma display panel (PDP) and an organic light-emitting device (OLED). The glass substrates used presently in the LCD industry may be applied in this etching solution.

The etching solution for a glass substrate provided in the invention is not a solution for thinning a substrate for all meanings, but an etching solution for treating the surface of a substrate when the thickness of the substrate is thinned to reach the target thickness. The etching solution can provide controllable optimal effect for the glossiness of the substrate surface while the qualified thickness of the substrate is ensured.

Therefore, the invention provides an etching solution and a process for etching a glass substrate, which dissolves the precipitated impurities attached to the surface of the substrate after substrate thinning so as to remove effectively the impurities on the surface of the substrate, improve the qualified ratio and non-defective ratio of the products, and at the same time, provide the effective insurance for controlling the thickness of the substrate. The etching solution and a process for etching a glass substrate provided in the invention can achieve the technical effect of removing the impurities on the surface of the substrate by dissolving and etching the impurities on the surface of the substrate, so as to solve effectively the problem of lower non-defective ratio of the substrates due to the attachment of the particulate impurities.

EXAMPLES

In the following examples, unless indicated specifically, all parts and ratios are in terms of weight.

Glass substrate: a substrate for liquid cell having a width of 550 mm, a length of 650 mm and a thickness of 1.0 mm, purchased from Corning The target thickness after thinning: 0.60 mm
The etching temperature: 35±3° C.
The etching time: 600 s
The etching procedure: a glass substrate is thinned in a hydrofluoric acid solution, and when the etching thickness of the substrate reaches to 0.65 mm, the substrate is pulled out of the hydrofluoric acid solution and put into an etching solution according to the following examples or comparative examples.

Evaluation for uniformity: 30 points are selected from a surface of the substrate uniformly, and the thicknesses ($T_i$, i=1 to 30) thereof are measured and the mean value (Ta) thereof is calculated. The uniformity of the thickness of the substrate represented in percentage is obtained as follows: obtaining ratios by dividing the thickness $T_i$ of each point by the mean value Ta; calculating the absolute values after the ratio has been subtracted by 1; and dividing a sum of 10 absolute values by 10 and then multiplying the quotient by 100, to obtain the uniformity of the thickness.

When the final thickness after the thinning is 0.60±0.02 mm, the evaluation is "Pass".

When the final thickness after the thinning is more than 0.62 mm, the evaluation is "Difficult to be controlled".

When the final thickness after the thinning is less than 0.58 mm, the evaluation is "Etching speed is fast and difficult to be controlled".

When the uniformity is less than or equal to 5%, the evaluation is "Relatively good".

When the uniformity is more than 5% but less than or equal to 8%, the evaluation is "Common".

When the uniformity is more than 8%, the evaluation is "Poor".

Example 1

100 parts by weight of an etching solution 1 of the invention was prepared from phosphoric acid, nitric acid, hydrofluoric acid, hydrochloric acid, sodium dodecyl sulfate and water, wherein the etching solution 1 comprised:
  30 parts by weight of phosphoric acid;
  20 parts by weight of nitric acid;
  10 parts by weight of hydrofluoric acid;
  5 parts by weight of hydrochloric acid;
  10 parts by weight of sodium dodecyl sulfate; and
  a balance of water.

The etching solution 1 of the invention was used in the above etching process and the final thickness after the thinning thereof was evaluated. The uniformity thereof was also evaluated. The obtained results were shown in Table 1.

Example 2

100 parts by weight of an etching solution 2 of the invention was prepared from phosphoric acid, nitric acid, hydrofluoric acid, hydrochloric acid, sodium dodecyl sulfate and water, wherein the etching solution 2 comprised:
  25 parts by weight of phosphoric acid;
  15 parts by weight of nitric acid;
  8 parts by weight of hydrofluoric acid;
  8 parts by weight of hydrochloric acid;
  8 parts by weight of sodium dodecyl sulfate; and
  a balance of water.

The etching solution 2 of the invention was used in the above etching process and the final thickness after the thinning thereof was evaluated. The uniformity thereof was also evaluated. The obtained results were shown in Table 1.

Example 3

100 parts by weight of an etching solution 3 of the invention was prepared from phosphoric acid, nitric acid, hydrofluoric acid, hydrochloric acid, sodium dodecyl sulfate and water, wherein the etching solution 3 comprised:

20 parts by weight of phosphoric acid;
12 parts by weight of nitric acid;
8 parts by weight of hydrofluoric acid;
8 parts by weight of hydrochloric acid;
5 parts by weight of sodium dodecyl sulfate; and
a balance of water.

The etching solution 3 of the invention was used in the above etching process and the final thickness after the thinning thereof was evaluated. The uniformity thereof was also evaluated. The obtained results were shown in Table 1.

Example 4

100 parts by weight of an etching solution 4 of the invention was prepared from phosphoric acid, nitric acid, hydrofluoric acid, hydrochloric acid, sodium dodecyl sulfate, sodium dodecyl benzene sulfonate and water, wherein the etching solution 4 comprised:
20 parts by weight of phosphoric acid;
12 parts by weight of nitric acid;
8 parts by weight of hydrofluoric acid;
8 parts by weight of hydrochloric acid;
3 parts by weight of sodium dodecyl sulfate;
3 parts by weight of sodium dodecyl benzene sulfonate; and
a balance of water.

The etching solution 4 of the invention was used in the above etching process and the final thickness after the thinning thereof was evaluated. The uniformity thereof was also evaluated. The obtained results were shown in Table 1.

Example 5

100 parts by weight of an etching solution 5 of the invention was prepared from phosphoric acid, nitric acid, hydrofluoric acid, hydrochloric acid, sodium dodecyl sulfate, sodium dodecyl benzene sulfonate and water, wherein the etching solution 5 comprised:
20 parts by weight of phosphoric acid;
12 parts by weight of nitric acid;
10 parts by weight of hydrofluoric acid;
8 parts by weight of hydrochloric acid;
3 parts by weight of sodium dodecyl sulfate;
3 parts by weight of sodium dodecyl benzene sulfonate; and
a balance of water.

The etching solution 5 of the invention was used in the above etching process and the final thickness after the thinning thereof was evaluated. The uniformity thereof was also evaluated. The obtained results were shown in Table 1.

Example 6

100 parts by weight of an etching solution 6 of the invention was prepared from phosphoric acid, nitric acid, hydrofluoric acid, hydrochloric acid, sodium dodecyl benzene sulfonate and water, wherein the etching solution 6 comprised:
20 parts by weight of phosphoric acid;
12 parts by weight of nitric acid;
8 parts by weight of hydrofluoric acid;
8 parts by weight of hydrochloric acid;
7 parts by weight of sodium dodecyl benzene sulfonate; and
a balance of water.

The etching solution 6 of the invention was used in the above etching process and the final thickness after the thinning thereof was evaluated. The uniformity thereof was also evaluated. The obtained results were shown in Table 1.

Example 7

100 parts by weight of an etching solution 7 of the invention was prepared from phosphoric acid, nitric acid, hydrofluoric acid, hydrochloric acid, sodium dodecyl benzene sulfonate and water, wherein the etching solution 7 comprised:
20 parts by weight of phosphoric acid;
12 parts by weight of nitric acid;
8 parts by weight of hydrofluoric acid;
8 parts by weight of hydrochloric acid;
5 parts by weight of sodium dodecyl benzene sulfonate; and
a balance of water.

The etching solution 7 of the invention was used in the above etching process and the final thickness after the thinning thereof was evaluated. The uniformity thereof was also evaluated. The obtained results were shown in Table 1.

Example 8

100 parts by weight of an etching solution 7 of the invention was prepared from phosphoric acid, nitric acid, hydrofluoric acid, hydrochloric acid and water, wherein the etching solution 8 comprised:
20 parts by weight of phosphoric acid;
12 parts by weight of nitric acid;
8 parts by weight of hydrofluoric acid;
8 parts by weight of hydrochloric acid; and
a balance of water.

The etching solution 8 of the invention was used in the above etching process and the final thickness after the thinning thereof was evaluated. The uniformity thereof was also evaluated. The obtained results were shown in Table 1.

Comparative Example 1

100 parts by weight of a comparative etching solution 1 was prepared from phosphoric acid, nitric acid, hydrofluoric acid, hydrochloric acid, sodium dodecyl sulfate and water, wherein the comparative etching solution 1 comprised:
30 parts by weight of phosphoric acid;
20 parts by weight of nitric acid;
20 parts by weight of hydrofluoric acid;
8 parts by weight of hydrochloric acid;
8 parts by weight of sodium dodecyl sulfate; and
a balance of water.

The comparative etching solution 1 was used in the above etching process and the final thickness after the thinning thereof was evaluated. The uniformity thereof was also evaluated. The obtained results were shown in Table 1.

Comparative Example 2

100 parts by weight of a comparative etching solution 2 was prepared from phosphoric acid, nitric acid, hydrofluoric acid, hydrochloric acid and water, wherein the comparative etching solution 2 comprised:
10 parts by weight of phosphoric acid;
10 parts by weight of nitric acid;
5 parts by weight of hydrofluoric acid;
5 parts by weight of hydrochloric acid; and
a balance of water.

The comparative etching solution 2 was used in the above etching process and the final thickness after the thinning thereof was evaluated. The uniformity thereof was also evaluated. The obtained results were shown in Table 1.

TABLE 1

| No. | Final thickness after the thinning | | Uniformity | |
|---|---|---|---|---|
| | Experimental mean value (mm) | Evaluation | Experimental value (%) | Evaluation |
| Example 1 | 0.54 | Difficult to be controlled | 10 | Poor |
| Example 2 | 0.585 | Pass | 7 | Common |
| Example 3 | 0.59 | Pass | 6 | Common |
| Example 4 | 0.60 | Pass | 4 | Relatively good |
| Example 5 | 0.61 | Pass | 5 | Relatively good |
| Example 6 | 0.60 | Pass | 3 | Relatively good |
| Example 7 | 0.61 | Pass | 4 | Relatively good |
| Example 8 | 0.62 | Pass/longer time | 8 | Common |
| Comparative Example 1 | 0.50 | Etching speed is fast and difficult to be controlled | 13 | Poor |
| Comparative Example 2 | 0.63 | Etching speed is slow and the thinning effect is not obvious | 10 | Poor |

From Table 1, it can be seen that the etching solutions according to the invention can maintain the uniformity of the thickness of the substrate and satisfy the demand for thinning. Examples 3 to 6 are preferable embodiments all of which may satisfy the demand for production. Especially, the etching solutions in examples 4 and 6 are the preferable etching solutions. The effects concerning whether an anionic surfactant is added or not and the utmost addition conditions are determined by the comparative examples 1 and 2.

By observing the etched glass substrate, it can be seen that the etching solutions according to the invention can effectively remove the silicate and other impurities attached to the surface of the substrate produced in the traditional substrate thinning process so as to effectively improve the glossiness of the surface of the substrate.

What is claimed is:

1. An etching solution, comprising:
   10 to 30 wt % of phosphoric acid;
   2 to 20 wt % of nitric acid;
   6 to 8 wt % of hydrofluoric acid;
   5 to 10 wt % of hydrochloric acid;
   5 to 8 wt % of an anionic surfactant; and
   water,
   wherein the weight percentages are based on the weight of the etching solution, and the anionic surfactant is sodium dodecyl benzene sulfonate.

2. The etching solution according to claim 1, wherein the etching solution comprises 10 to 20 wt % of nitric acid.

3. The etching solution according to claim 1, wherein the etching solution is composed of:
   10 to 30 wt % of phosphoric acid;
   10 to 20 wt % of nitric acid;
   6 to 8 wt % of hydrofluoric acid;
   5 to 10 wt % of hydrochloric acid;
   5 to 8 wt % of the anionic surfactant; and
   a balance of water,
   wherein the weight percentages are based on the weight of the etching solution.

4. A process for etching a glass substrate, comprising:
   contacting an etching solution with the glass substrate, wherein the etching solution comprises:
   10 to 30 wt % of phosphoric acid;
   2 to 20 wt % of nitric acid;
   6 to 8 wt % of hydrofluoric acid;
   5 to 10 wt % of hydrochloric acid;
   5 to 8 wt % of an anionic surfactant; and
   water,
   wherein the weight percentages are based on the weight of the etching solution, and the anionic surfactant is sodium dodecyl benzene sulfonate.

5. The process according to claim 4, wherein the etching solution comprises 10 to 20 wt % of nitric acid.

6. The process according to claim 4, wherein the etching solution is composed of:
   10 to 30 wt % of phosphoric acid;
   10 to 20 wt % of nitric acid;
   6 to 8 wt % of hydrofluoric acid;
   5 to 10 wt % of hydrochloric acid;
   5 to 8 wt % of the anionic surfactant; and
   a balance of water,
   wherein the weight percentages are based on the weight of the etching solution.

7. The process according to claim 4, wherein the contacting comprises impregnating the glass substrate into the etching solution, wherein the contacting time is 300 s to 1500 s, the contacting temperature is 30° C. to 38° C., and the size of the substrate ≤500 mm×600 mm.

8. The process according to claim 4, wherein the contacting comprises impregnating the glass substrate into the etching solution, wherein the contacting time is 300 s to 1500 s, the contacting temperature is 33° C. to 42° C., and the size of the substrate >500 mm×600 mm.

* * * * *